(12) United States Patent
Sugawara et al.

(10) Patent No.: US 7,163,168 B2
(45) Date of Patent: Jan. 16, 2007

(54) SPINNING REEL HANDLE ASSEMBLY

(75) Inventors: Ken'ichi Sugawara, Sakai (JP); Shingo Matsuo, Sakai (JP); Masuo Ban, Sakai (JP)

(73) Assignee: Shimano Inc., Osaka (JP)

( * ) Notice: Subject to any disclaimer, the term of this patent is extended or adjusted under 35 U.S.C. 154(b) by 0 days.

(21) Appl. No.: 11/349,528

(22) Filed: Feb. 8, 2006

(65) Prior Publication Data
US 2006/0175448 A1    Aug. 10, 2006

(30) Foreign Application Priority Data
Feb. 9, 2005    (JP) .............................. 2005-033605

(51) Int. Cl.
*A01K 89/01* (2006.01)
(52) U.S. Cl. .................... 242/284; 74/547; 242/282
(58) Field of Classification Search ........ 242/282–284; 74/545–547
See application file for complete search history.

(56) References Cited
U.S. PATENT DOCUMENTS

| 2,766,956 A | 10/1956 | Sarah |
| 3,948,117 A | 4/1976 | Kimura |
| 5,244,166 A * | 9/1993 | Oi ............................. 242/284 |
| 5,690,289 A * | 11/1997 | Takeuchi et al. ........... 242/282 |
| 6,626,385 B1 * | 9/2003 | Tsutsumi ................... 242/282 |
| 6,883,738 B1 * | 4/2005 | Nakajima et al. .......... 242/282 |
| 7,070,137 B1 * | 7/2006 | Nishikawa et al. ........ 242/282 |

FOREIGN PATENT DOCUMENTS

| GB | 2023983 A | 1/1980 |
| JP | S53-130195 | 10/1978 |
| JP | 2002-209484 A | 7/2002 |

* cited by examiner

Primary Examiner—Kathy Matecki
Assistant Examiner—Evan H. Langdon
(74) Attorney, Agent, or Firm—Global IP Counselors, LLP

(57) ABSTRACT

A spinning reel handle assembly that does not expose a male threaded section to the outside includes a handle shaft portion, a cylindrical cover member, a cylindrical screw-threaded member and a cylindrical moveable member. The cylindrical cover member is mounted on an external circumference of a tip end section of the handle shaft portion. The cylindrical cover member is configured to cover at least a portion of an external circumference of the moveable member and an entire portion of the male threaded section of the cylindrical screw-threaded member on which the cylindrical moveable member is not mounted.

12 Claims, 12 Drawing Sheets

SPINNING REEL HANDLE ASSEMBLY

CROSS-REFERENCE TO RELATED APPLICATIONS

This application claims priority under 35 U.S.C. § 119 to Japanese Patent Application No. 2005-33605. The entire disclosure of Japanese Patent Application No. 2005-33605 is hereby incorporated herein by reference.

BACKGROUND OF THE INVENTION

1. Field of the Invention

The present invention generally relates to a handle assembly. More specifically, the present invention relates to a handle assembly configured to be mounted to a master gear shaft that is rotationally supported on a reel unit of a spinning reel.

2. Background Information

A spinning reel generally includes a reel unit, a spool, a rotor and a rotation transfer mechanism. The reel unit has a handle assembly and is configured to be mounted to a fishing rod. The spool is mounted to the reel unit such that it can move freely. The fishing line is wound onto the spool. The rotor is rotatably supported on the reel unit. The rotor winds the fishing line onto the spool. The rotation transfer mechanism is configured to transfer a rotation of the handle assembly to the rotor. The rotation transfer mechanism includes a master gear, a master gear shaft on which the master gear is arranged and a pinion gear that meshes with the master gear. The rotor is connected to a frontward part of the pinion gear. The master gear shaft is a cylindrical member in which a non-circular (e.g., rectangular) through hole has been formed.

The handle assembly includes a handle shaft portion, a handle arm and a handle grip. The handle shaft portion is installed from either the right end or the left end of the master gear shaft. The handle arm extends in a radial direction from the handle shaft portion. The handle grip is mounted to a tip end of the handle arm. An external shape of the handle shaft portion is non-circular (e.g., rectangular) so that it is held non-rotatably in the through hole of the master gear shaft. The handle arm is mounted to a tip end of the handle shaft portion such that it can pivot and be folded in toward the reel unit. (See, for example, Japanese Laid-Open Patent Publication No. 53-130195.)

The handle assembly also includes a screw-threaded member and a movable member. The screw-threaded member is non-rotatably mounted to the tip end of the handle shaft portion. The screw-threaded member has a male threaded section formed on an external circumference thereof. The movable member has a female threaded section on an internal circumference of the movable member. The female threaded section is configured to thread onto the male threaded section. The movable member is configured and arranged to contact a base end part of the handle arm. When fishing, the movable member is put in contact with the base end part of the handle arm such that the pivot motion of the handle arm is restricted and the handle is operated. When the reel is to be stored, the movable member is moved toward the reel unit such that it separates from the base end part of the handle arm, thereby enabling the handle arm to be folded toward the reel unit so as to make the reel more compact as a whole.

The conventional handle assembly described above is provided with the screw-threaded member and the movable member on the tip end of the handle shaft portion such that the handle arm can be folded inwardly toward the reel unit. However, when the movable member contacts the base end part of the handle arm, the male threaded section of the screw-threaded member is exposed to the outside. When the male threaded section is exposed to the outside, seawater, mud, and the like can stick to the male threaded section. This requires additional maintenance time and potentially causes the male threaded section to become damaged due to exposure to a corrosive environment.

In view of the above, it will be apparent to those skilled in the art from this disclosure that there exists a need for an improved handle assembly that does not expose the male threaded section to the outside. This invention addresses this need in the art as well as other needs, which will become apparent to those skilled in the art from this disclosure.

SUMMARY OF THE INVENTION

A spinning reel handle assembly in accordance with a first aspect of the present invention is a spinning reel handle assembly that includes a handle shaft portion, a cylindrical cover member, a cylindrical screw-threaded member, a cylindrical movable member, a handle arm and a handle grip. The handle shaft portion is configured to be non-rotatably mounted to an internal section of a master gear shaft relative to the master gear shaft. The handle shaft portion has a tip end section that protrudes from an end part of the master gear shaft. The cylindrical cover member is mounted on an external circumference of the tip end section of the handle shaft portion. The cylindrical cover member is configured to cover an outer periphery of the tip end section of the handle shaft portion. The cylindrical screw-threaded member is non-rotatably disposed relative to the handle shaft portion on the external circumference of the tip end section of the handle shaft portion. The cylindrical screw-threaded member has a male threaded section on an external circumference of the cylindrical screw-threaded member. The movable member is configured to be inside an internal circumference of the cylindrical cover member. The movable member has an internal circumference with a female threaded section configured to be threaded onto the male threaded section. The handle arm has a base end and a contact part. The base end is pivotally mounted to the tip end section of the handle shaft portion. The contact part is configured to restrict pivoting when the contact part contacts an end face of the movable member and to allow pivoting when the contact part is separated from the end face of the movable member. The handle arm extends in a direction that intersects with a center axis of the handle shaft portion. The handle grip is mounted to a tip end of the handle arm to rotate freely about an axis that is substantially parallel to the center axis of the handle shaft portion. The cylindrical cover member is configured to cover at least a portion of an external circumference of the movable member and an entire portion of the male threaded section on which the movable member is not mounted.

With this handle assembly, since the cover member covers at least a portion of the outside circumference of the movable member and the entire outside circumference of the portion of the male threaded section on which the movable member is not mounted, the male threaded section is always covered by either the cover member or the movable member regardless of the position of the movable member. As a result, the male threaded section is never exposed to the outside.

A handle assembly in accordance with a second aspect of the present invention is a handle assembly according to the first aspect of the present invention, wherein the cover member is furnished with: first cylindrical section configured to cover the outside of a portion of the rear body that supports an end part of the master gear shaft; and a second cylindrical section configured to protrude toward the opposite side as the first cylindrical section and cover a portion of the external circumference of said male threaded section. With this handle assembly, since the cover member covers the outside of the reel unit, seawater, mud, and other contaminants are prevented from entering the inside of the reel via the gap between the cover member and the reel unit.

A handle assembly in accordance with a third aspect of the present invention is a handle assembly according to the first or second aspect of the present invention, wherein the cover member and the handle shaft portion are formed as a one-piece unitary entity. With this handle assembly, the total number of component parts are reduced because the cover member and the handle shaft portion are formed by, for example, insert molding.

A handle assembly in accordance with a fourth aspect of the present invention is a handle assembly according to the first or second aspect of the present invention, wherein the cover member and the handle shaft portion are formed as separate entities. With this handle assembly, the cover member is formed more easily.

A handle assembly in accordance with a fifth aspect of the present invention is a handle assembly according to any one of the first through fourth aspects of the present invention, wherein the screw-threaded member and the cover member are formed as a one-piece unitary entity. With this handle assembly, the total number of component parts is reduced because the cover member is provided non-rotatably on the handle shaft portion and the screw-threaded member is formed as a one-piece unitary entity.

A handle assembly in accordance with a sixth aspect of the present invention is a handle assembly according to the first, second or fourth aspect of the present invention, wherein the screw-threaded member and the cover member are formed as separate entities. With this handle assembly, the screw-threaded member is formed more easily because it is processed in a standalone fashion and secured to the cover member provided non-rotatably on the handle shaft portion by, for example, press fitting.

A handle assembly in accordance with a seventh aspect of the present invention is a handle assembly according to any one of the first through sixth aspects of the present invention, wherein an elastic member is provided between an internal circumferential portion of the cover member and an external circumferential portion of the movable member. With this handle assembly, seawater, mud, and other contaminants are prevented from entering the inside of the reel via the gap between the cover member and the movable member.

A handle assembly in accordance with an eighth aspect of the present invention is a handle assembly according to any one of the first through seventh aspects of the present invention, further provided with a first force applying member that is arranged between the movable member and the handle arm and configured to apply a force against the movable member toward the handle arm. With this handle assembly, undesirable looseness of the movable member is suppressed.

A handle assembly in accordance with a ninth aspect of the present invention is a handle assembly according to any one of the first through eighth aspects of the present invention, further provided with a second force applying member that is arranged between the cover member and the movable member and the handle arm and configured to apply a force against the movable member toward the handle arm. With this handle assembly, undesirable looseness of the movable member is suppressed.

A handle assembly in accordance with a tenth aspect of the present invention is a handle assembly according to any one of the first through ninth aspects of the present invention, further provided with a bush member that is arranged between the cover member and the master gear shaft and configured such that its external circumference tapers from the cover member toward the master gear shaft. With this handle assembly, undesirable looseness between the cover member and the master gear shaft is suppressed.

A handle assembly in accordance with an eleventh aspect of the present invention is a handle assembly according to any one of the first through tenth aspects of the present invention, wherein the movable member is furnished with: a main body member having a female threaded section on the internal circumference thereof; and a ring-shaped member provided as a separate entity from the main body member and arranged and configured such that the end face thereof can contact the contact part of the handle arm. With this handle assembly, since the end face of the ring-shaped member contacts the contact part of the handle arm, scratching and deformation of the main body member is prevented.

In a spinning reel handle assembly in accordance with the present invention, the cover member is configured to cover at least a portion of the outside circumference of the movable member and the entire outside circumference of the portion of the male threaded section on which the movable member is not mounted.

These and other objects, features, aspects and advantages of the present invention will become apparent to those skilled in the art from the following detailed description, which, taken in conjunction with the annexed drawings, discloses preferred embodiments of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Figure 1:
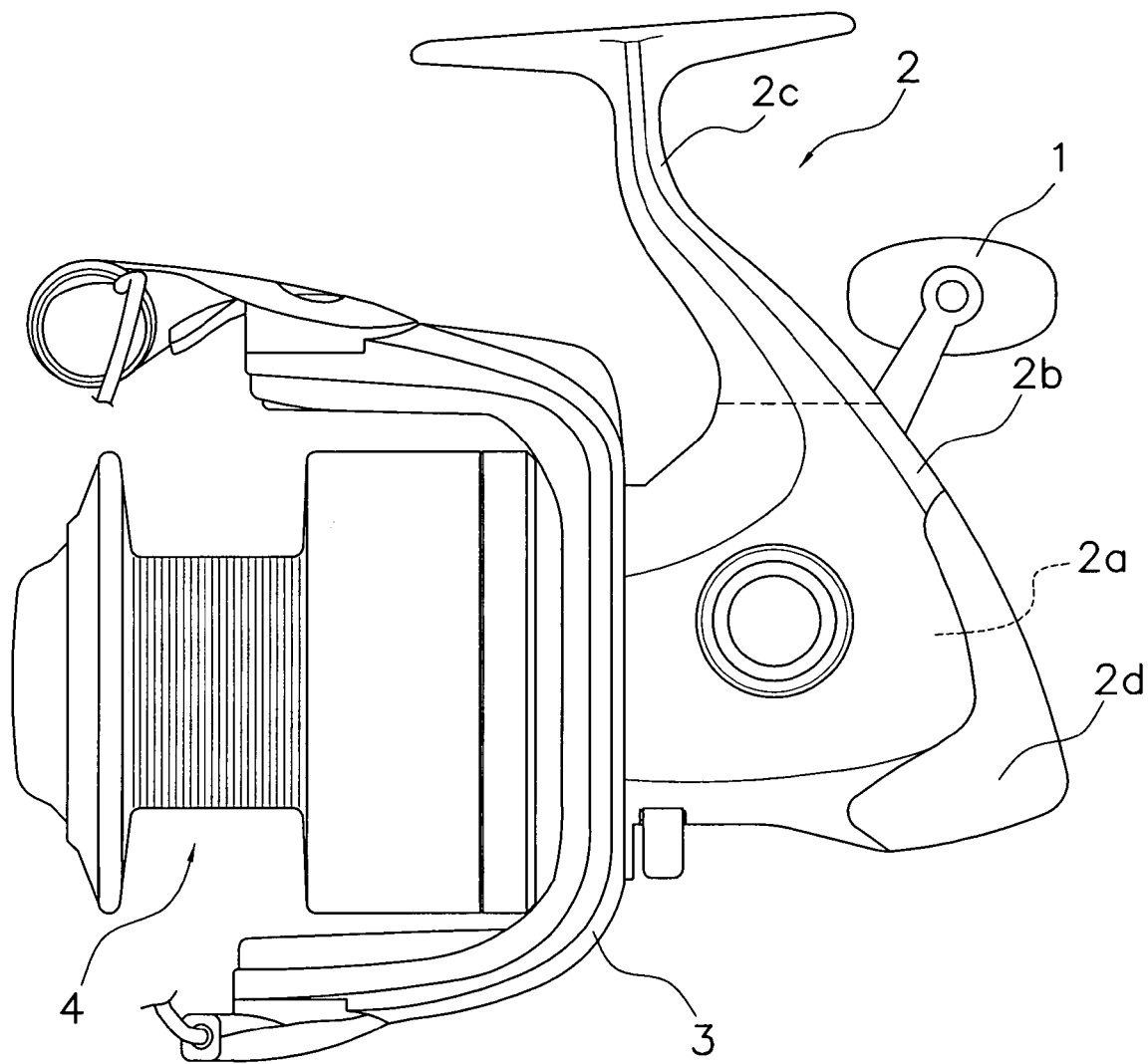
FIG. 1 is a side elevational view of a spinning reel equipped with a handle assembly in accordance with a first embodiment of the present invention.

Referring initially to FIG. 1, a spinning reel is illustrated in accordance with a first embodiment of the present invention. As shown in FIGS. 1–4, the spinning reel includes a handle assembly 1, a reel unit 2, a rotor 3 and a spool 4. The handle assembly 1 is supported on the reel unit 2 in a freely rotatable manner. The rotor 3 is rotatably supported on a frontward portion of the reel unit 2. The spool 4 supports a fishing line, which is wound around an outer periphery of the spool 4. The spool 4 is rotatably supported on a frontward portion of the reel unit 2. The handle assembly 1 is selectively mounted on either a right side (see FIGS. 1 and 2) or a left side (see FIGS. 3 and 4) of the reel unit 2. A bottomed cylindrical cap member 19 is attached to the side of the reel unit 2 opposite the side on which the handle assembly 1 is mounted (e.g., on the right side of the reel unit 2 in FIGS. 3 and 4).

Figure 3:
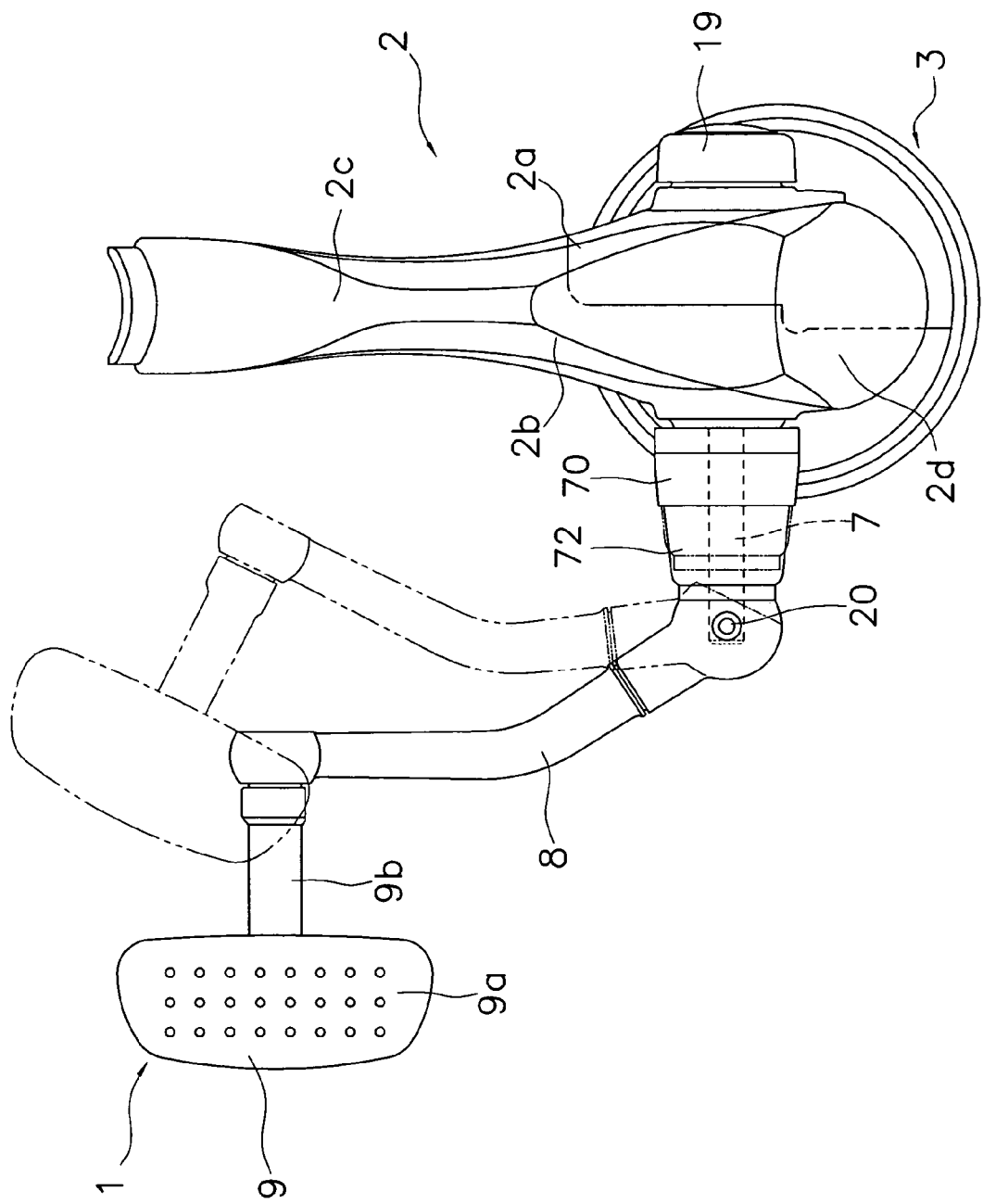
FIG. 3 is a rear plan view of the spinning reel and handle assembly illustrated in FIG. 1 in accordance with the first embodiment of the present invention.
Figure 4:
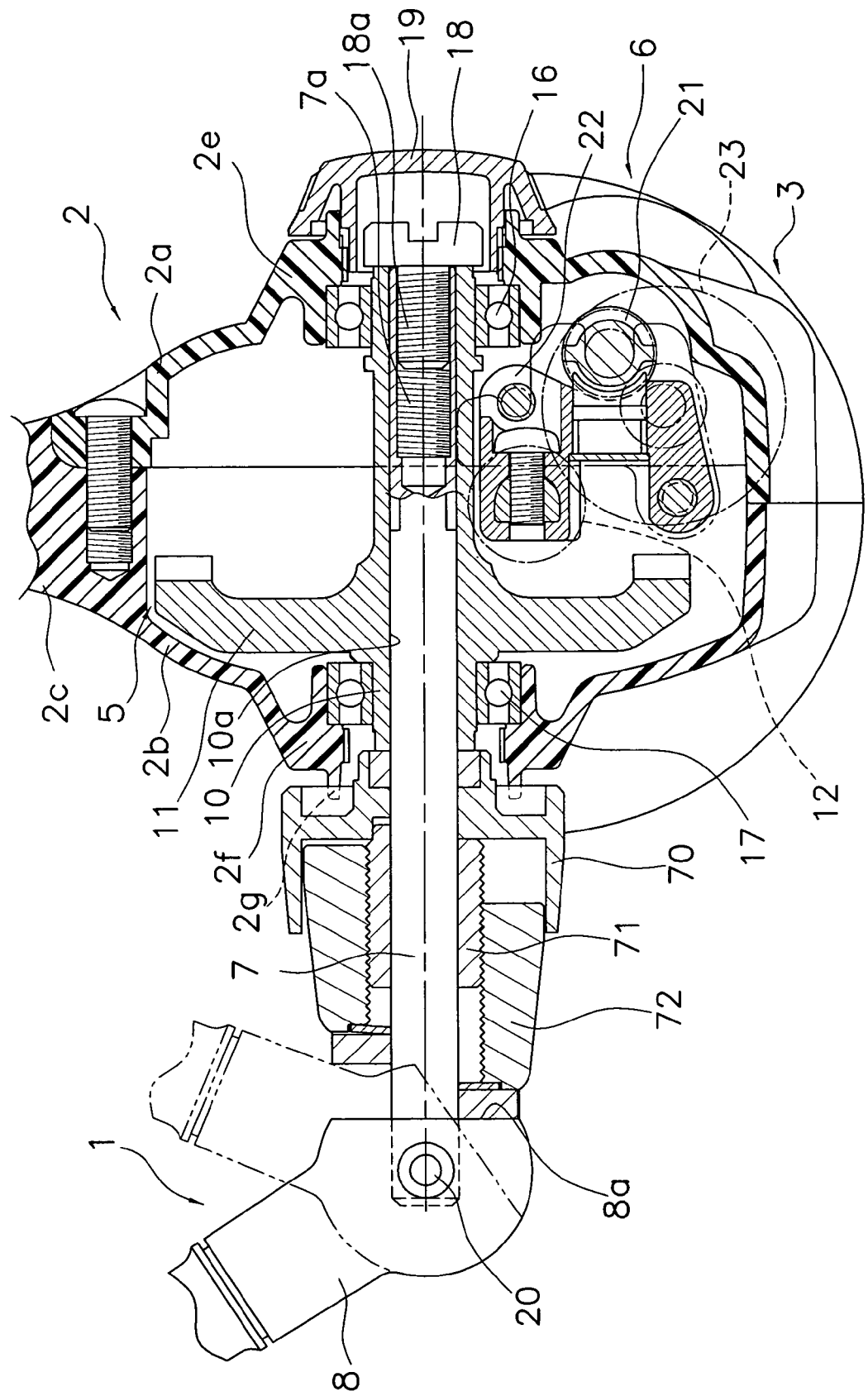
FIG. 4 is a partial rear cross-sectional view of the spinning reel and handle assembly illustrated in FIG. 3 in accordance with the first embodiment of the present invention.

As shown in FIGS. 3 and 4, the handle assembly 1 includes a handle shaft portion 7, a handle arm 8 and a handle grip 9 that is mounted to a tip end of the handle arm 8. The handle arm 8 is mounted such that it extends in a radial direction from a tip end section of the handle shaft portion 7. The handle arm 8 pivots relative to the handle shaft portion 7.

Figure 5:
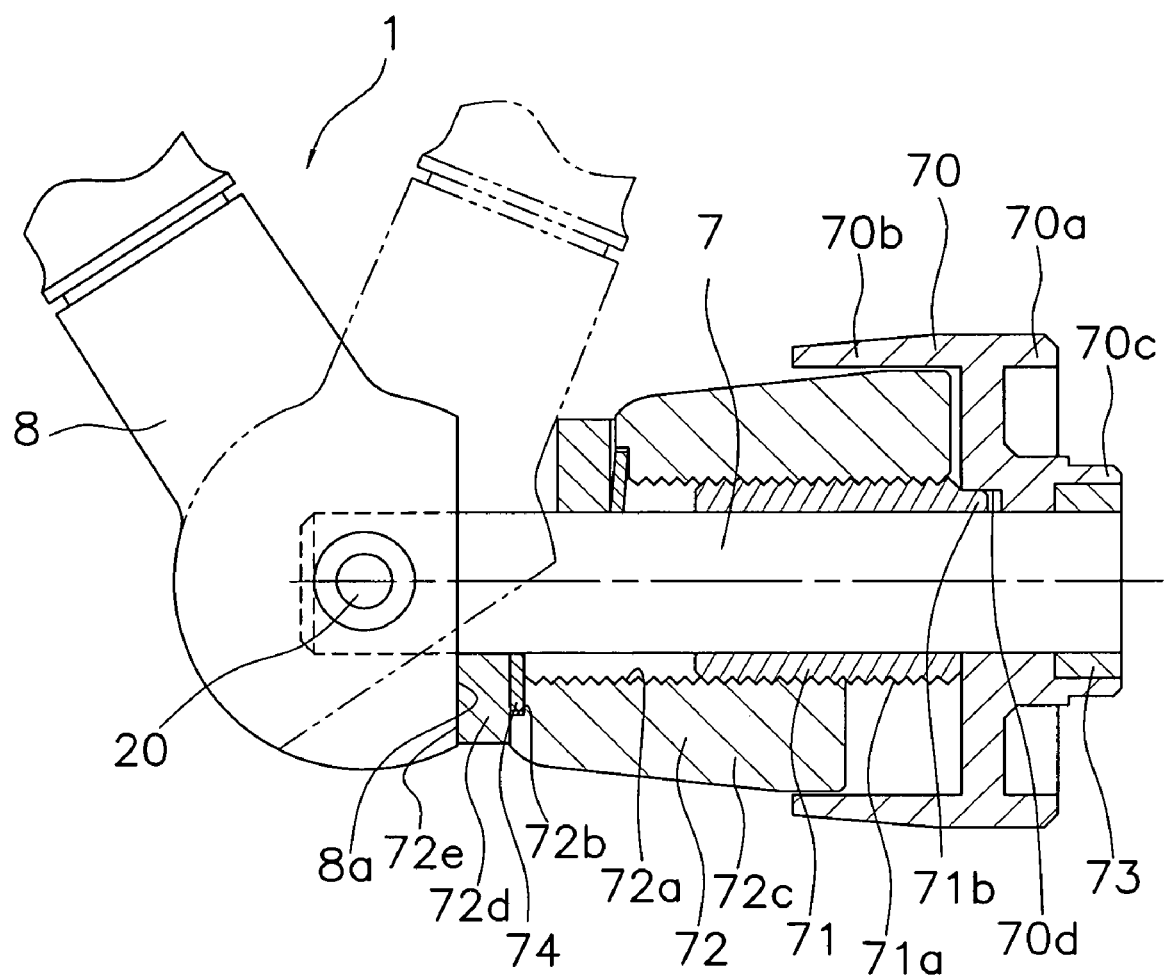
FIG. 5 is a partial cross-sectional view of the handle assembly illustrated in FIGS. 3 and 4 in accordance with the first embodiment of the present invention.

As shown in FIGS. 4 and 5, the handle assembly 1 further includes a cylindrical cover member 70, a cylindrical screw-threaded member 71, a cylindrical movable member 72 and a second ring-shaped member 73. The cylindrical cover member 70 is mounted on the external circumference of the tip end section of the handle shaft portion 7. The cylindrical cover member 70 is configured to cover the outside of the tip end section of the handle shaft portion 7. The cylindrical screw-threaded member 71 is arranged on the external circumference of the tip end section of the handle shaft portion 7 in a non-rotatably manner relative to the handle shaft portion 7. The movable member 72 is arranged inside the internal circumference of the cover member 70.

Figure 2:
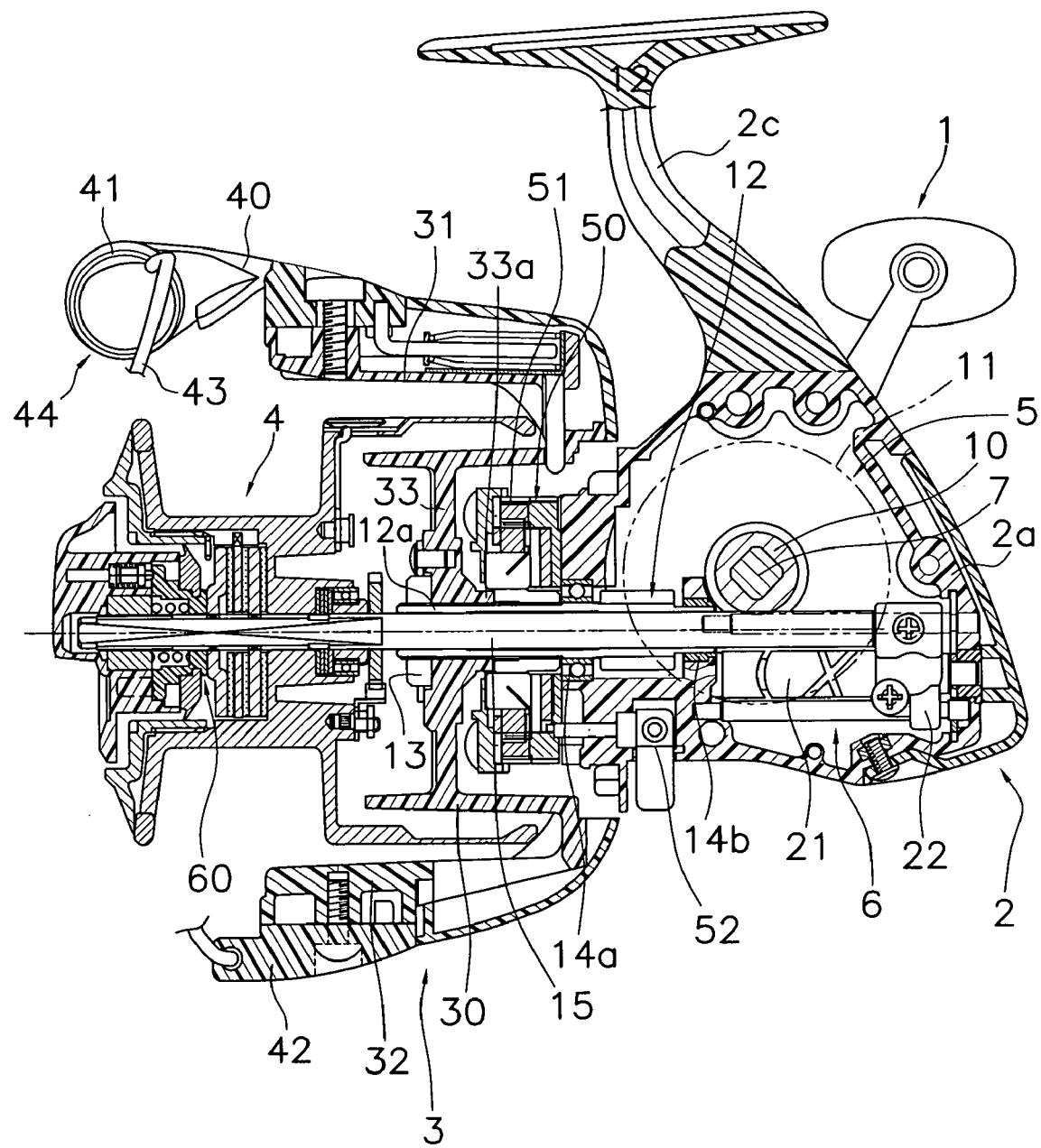
FIG. 2 is a side cross-sectional view of the spinning reel illustrated in FIG. 1 in accordance with the first embodiment of the present invention.

As shown in FIGS. 2 and 4, a rotor drive mechanism 5 has a master gear shaft 10, a master gear 11 and a pinion gear 12. The pinion gear 12 meshes with the master gear 11. The master gear 11 rotates together with the master gear shaft 10.

As shown in FIG. 4, the master gear shaft 10 is a cylindrical member formed as a one-piece unitary member with the master gear 11. As shown in FIG. 4, the master gear shaft 10 is rotatably supported on the reel unit 2 by first and second bearings 16 and 17 mounted inside the first and second boss sections 2e and 2f that protrude from both sides of the reel unit 2. The pinion gear 12 is a cylindrical member that passes through a center portion of the rotor 3. The pinion gear 12 has a front section 12a that is fastened to the rotor 3 with a nut 13. The pinion gear 12 further has middle and rear sections that are rotatably supported on the reel unit 2 by third and fourth bearings 14a and 14b. The master gear shaft 10 has a through hole 10a with an internal shape that is rectangular or another non-circular shape.

As shown in FIGS. 1–4, the reel unit 2 has a reel body 2a, a lid member 2b, a fishing rod mounting leg 2c, a cover member 2d, first and second bosses 2e and 2f and an end cylindrical section 2g. The lid member 2b is detachably mounted to the reel body 2a in such a fashion as to block an opening of the reel body 2a. The reel body 2a is generally hollow. The fishing rod mounting leg 2c is configured to extend diagonally frontward and upward from the lid member 2b. The cover member 2d is configured and arranged to span from a rearward portion to a lower portion of the reel body 2a and the lid member 2b. The rotor drive mechanism 5 is configured to rotationally interlock the rotor 3 with the handle assembly 1. An oscillating mechanism 6 is configured to move the spool 4 in order to wind the fishing line in a uniform manner.

As shown in FIG. 2, the handle shaft portion 7 has a non-circular (e.g., rectangular) external shape. The handle shaft portion 7 is mounted to the through hole 10a of the master gear shaft 10. Thus, the handle shaft portion 7 cannot rotate relative to the master gear shaft 10. A tip end section of the handle shaft portion 7 protrudes to the outside of an end part of the master gear shaft 10. The handle shaft portion 7 is axially movable in the through hole 10a. The handle shaft portion 7 has a female threaded section 7a that is formed inside an end part (right end in FIG. 4) of the handle shaft portion 7. A bolt member 18 having a male threaded section 18a is threaded into the female threaded section 7a of the handle shaft portion 7. Thus, the handle shaft portion 7 is secured to the master gear shaft 10.

As shown in FIG. 3, the handle arm 8 is a rod-like member made of, for example, an aluminum alloy. The handle arm 8 is formed to bend slightly toward the reel unit 2. One end (lower end in FIG. 3) of the handle arm 8 is connected to the tip end section (left end in FIG. 3) of the handle shaft portion 7 with a pin member 20 such that the reel unit 2 can pivot toward and away from the reel unit 2. The handle grip 9 of the handle assembly 1 is rotatably mounted to the other end (upper end in FIG. 3) of the handle arm 8.

As shown in FIG. 3, the handle grip 9 includes a grip part 9a and a shaft portion 9b. The shaft portion 9b is mounted to the handle arm 8 such that it is able to freely rotate about an axis substantially parallel to the handle shaft portion 7. The grip part 9a is fixed to an end of the shaft portion 9b. The grip part 9a serves as a place for a fisherman to grip the handle assembly 1. The grip part 9a is made of, for example, a synthetic resin or cork material. The shaft portion 9b is made of, for example, a metal material.

Referring to FIGS. 3–5, the cover member 70 is provided as a separate member from the handle shaft portion 7. The cover member 70 is mounted to the handle shaft portion 7 by insert molding such that it cannot rotate relative to the handle shaft portion 7. It will be apparent to one of ordinary skill in the art from this disclosure that although the cover member 70 is formed by insert molding with the handle shaft portion 7 in the embodiment, the present invention is not limited to such method and it is also acceptable to form the cover member 70 and the handle shaft portion 7 as a one-piece unitary member.

The cover member 70 has first and second cylindrical sections 70a and 70b, a cylindrical cover part 70c and a staking recession 70d. The first cylindrical section 70a is configured to cover an outside of the end cylindrical section 2g (see FIG. 4) of the second boss section 2f that supports an end part of the master gear shaft 10. The second cylindrical section 70b is configured to protrude in an opposite direction as the first cylindrical section 70a. The cover part 70c inwardly protrudes toward the end cylindrical section 2g (see FIG. 4) from within the internal circumference of the first cylindrical section 70a. The second ring-shaped member 73 is installed inside the cover part 70c and arranged such that a tip end thereof touches against the end part of the master gear shaft 10. A portion of the cover member 70 is recessed along an axial direction from the internal circumference of the second cylindrical section 70b.

As shown in FIG. 5, the screw-threaded member 71 is a cylindrical member having a male threaded section 71a and a staking protrusion 71b. The male threaded section 71a is formed on the external circumference of the screw-threaded member 71. The male threaded section 71a is provided as a separate entity from the cover member 70. The staking protrusion 71b is formed on the rearward end (right end in FIG. 5) of the screw-threaded member 71. The staking protrusion 71b serves to stake or secure the screw-threaded member 71 to the cover member 70 by being inserted into the staking recession 70d. As shown in FIG. 5, the cover member 70 is configured to cover at least a portion of the outside circumference of the movable member 72 and the entire outside circumference of the portion of the male threaded section 71a on which the movable member 72 is not mounted.

As shown in FIG. 5, the movable member 72 is a cylindrical member that includes a countersink section 72b and a main body member 72c having a female threaded section 72a formed on an internal section thereof. The female threaded section 72a of the movable member 72 is threaded onto the male threaded section 71a. The countersink section 72b is formed by countersinking a tip end (left end in FIG. 5) of the main body member 72c to a diameter that is larger than a diameter of the female threaded section 72a. A first force applying member 74 is, a belleville spring, for example, that is installed into the countersink section 72b. The first force applying member 74 applies a force against the main body member 72c and prevents the main body member 72c from loosening. The movable member 72 further includes a first ring-shaped member 72d that is a separate member from the main body member 72c. The first ring-shaped member 72d is mounted such that it contacts the tip end of the main body member 72c. The first ring-shaped member 72d is biased toward the handle arm 8 by the first force applying member 74. The handle arm 8 has a contact part 8a that is configured to restrict pivoting when it contacts an end face 72e of the first ring-shaped member 72d (see lower portion of FIG. 5) and to allow pivoting when the contact part 8a is separated from the end face 72e (see upper portion of FIG. 5).

In order to fold the handle arm 8, the movable member 72 is rotated in a tightening direction, as shown in FIGS. 4 and 5, such that the female threaded section 72a screws onto the male threaded section 71a of the screw-threaded member 71 and the screw-threaded member 72 moves toward the reel unit 2 (to the right in FIGS. 4 and 5). When this is done, the end face 72e separates from the contact part 8a and a gap develops between the movable member 72 and the handle arm 8, thereby enabling the handle arm 8 to be folded over toward the reel unit 2 (see upper portion of FIG. 5).

In order to pivot the handle arm 8 to such a position that it can be rotated, the movable member 72 is rotated in the loosening direction as shown in FIGS. 4 and 5 such that the female threaded section 72a screws off of the male threaded section 71a of the screw-threaded member 71 and the screw-threaded member 72 moves away from the reel unit 2 (to the left in FIGS. 4 and 5). When this is done, the end face 72e of the first ring-shaped member 72d of the movable member 72 contacts the contact part 8a of the handle arm 8 and the handle arm 8 becomes unable to pivot with respect to the movable member 72 and able to be rotated (see lower portion of FIG. 5).

As shown in FIGS. 2 and 4, the oscillating mechanism 6 is configured to move a spool shaft 15. The spool shaft 15 passes through a center of the spool 4 and connects to a drag mechanism 60. The spool 4 moves along the spool shaft 15 with the drag mechanism 60. The oscillating mechanism 6 has a helical shaft 21, a slider 22 and an intermediate gear 23. The helical shaft 21 is arranged below and parallel to the spool shaft 15. The slider 22 is fastened in a non-rotatable manner to a rear end of the spool shaft 15. The slider 22 is configured to move along the helical shaft 21. The intermediate gear 23 is fixed to a tip end of the helical shaft 21. The intermediate gear 23 meshes with the pinion gear 12 via a reduction gear mechanism (not shown). The reduction gear mechanism enables the oscillating mechanism 6 to oscillate slowly so that the fishing line is wound onto the spool 4 in a precise manner.

As shown in FIG. 2, the rotor 3 has a cylindrical part 30, first and second rotor arms 31 and 32, a front wall 33 and a bail arm 44. The first and second rotor arms 31 and 32 are arranged to face each other on opposite sides of the cylindrical part 30. The cylindrical part 30 and the first and second rotor arms 31 and 32 are formed as a one-piece unitary member. The front wall 33 is formed on a front portion of the cylindrical part 30. The front wall 33 has a boss section 33a that is provided at a middle portion of the front wall 33. The boss section 33a has a through hole formed in a center thereof. The spool shaft 15 and the front section of the pinion gear 12 pass through the through hole of the boss section 33a. The nut 13 is disposed on the front portion of the front wall 33 and serves to fasten the front section 12a of the pinion gear 12 to the rotor 3.

The first rotor arm 31 curves convexly outward from the cylindrical part 30 and extends forward. The bail arm 44 includes a first bail support member 40, a second bail support member 42, a line roller 41 and a bail 43. The first bail support member 40 is mounted pivotally to an outer circumference of a tip end of the first rotor arm 31. The line roller 41 guides the fishing line to the spool 4. The line roller 41 is mounted on a tip end of the first bail support member 40. The second rotor arm 32 curves convexly outward from the cylindrical part 30 and extends forward. The second bail support member 42 is mounted pivotally to an outer circumference of a tip end of the second rotor arm 32. The bail 43 has a wire material bent into a U-shape. The bail 43 is fixed between the line roller 41 and the second bail support member 42. The bail arm 44 is configured such that it pivots freely between a line guiding position shown in FIG. 2 and a line release position that is inverted relative to the line guiding position.

A reverse rotation preventing mechanism 50 for selectively prohibiting and allowing reverse rotation of the rotor 3 is arranged inside the cylindrical part 30 of the rotor 3. The reverse rotation preventing mechanism 50 includes a roller-type one-way clutch 51 having a freely rotating inner ring and a switching mechanism 52 configured to switch the one-way clutch between an engaged state (reverse rotation prohibited) and a disengaged state (reverse rotational allowed).

As shown in FIG. 2, the spool 4 is arranged between the first rotor arm 31 and the second rotor arm 32 of the rotor 3 and mounted to the tip end of the spool shaft 15 via the drag mechanism 60.

How the reel is operated and how it operates will now be described. When the bail arm 44 is inverted so that the fishing rod can cast the fishing line, the first bail support member 40 and the second bail support member 42 pivot and the bail arm 44 is placed in a line release position. From this state, the fishing rod is cast while holding the fishing line with an index finger of a hand gripping the fishing rod. A weight of a terminal tackle causes the fishing line to be dispensed vigorously forward. Then, when the handle assembly 1 is rotated in a fishing line wind-in direction, the rotor drive mechanism 5 rotates the rotor 3 in the line wind-in direction and a bail inverting mechanism (not shown) restores the bail arm 44 to the line wind-in position so that the fishing line is wound onto the spool 4.

Since the cover member 70 of the handle assembly 1 covers at least a portion of the outside circumference of the movable member 72 and the entire outside circumference of the portion of the male threaded section 71a on which the movable member 72 is not mounted, the male threaded section 71a is always covered by either the cover member 70 or the movable member 72 regardless of the position of the movable member 72. As a result, the male threaded section 71a is never exposed to the outside.

Although the previously described embodiment is presented using a spinning reel having a front drag mechanism as an example, the present invention can also be applied to other spinning reels, such as a spinning reel having both a front drag mechanism and a lever drag mechanism.

As used herein, the following directional terms "forward, rearward, above, downward, vertical, horizontal, below and transverse" as well as any other similar directional terms refer to those directions of a device equipped with the present invention. Accordingly, these terms, as utilized to describe the present invention should be interpreted relative to a device equipped with the present invention.

Second Embodiment

Figure 6:
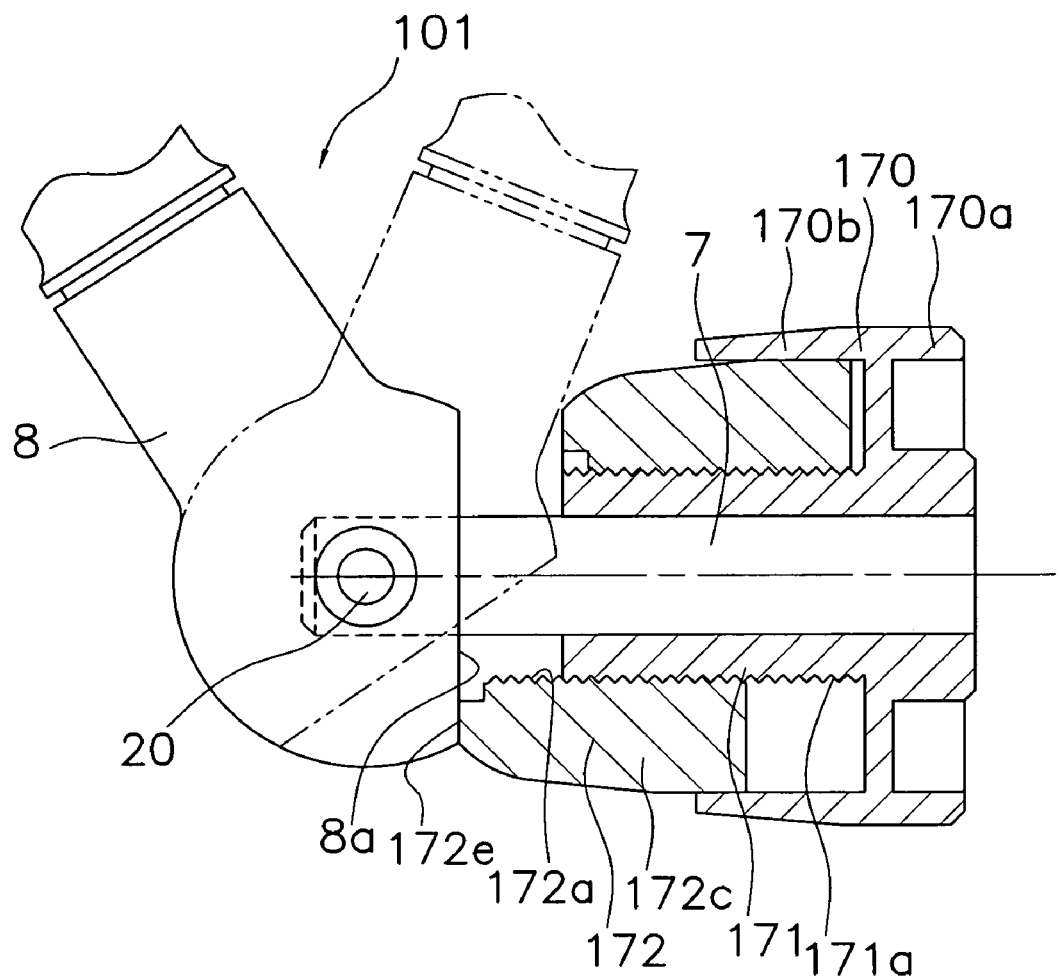
FIG. 6 is a partial cross-sectional view of a handle assembly for the spinning reel illustrated in FIGS. 1 and 2 in accordance with a second embodiment of the present invention.

Referring now to FIG. 6, a handle assembly 101 in accordance with a second embodiment will now be explained. In view of the similarity between the first and second embodiments, the parts of the second embodiment that are identical to the parts of the first embodiment will be given the same reference numerals as the parts of the first embodiment. Moreover, the descriptions of the parts of the second embodiment that are identical to the parts of the first embodiment may be omitted for the sake of brevity.

In the previously described embodiment the movable member 72 has a main body member 72c and a separate first ring member 72d. In the second embodiment, a movable member 172 does not have the separate first ring member 72d. The movable member 172 has an end face 172e of a main body member 172c that contacts the contact part 8a of the handle arm 8 directly, as shown in FIG. 6.

In the previously described embodiment the cover member 70 and the screw-threaded member 71 are separate members. In the second embodiment, a cover member 170 and a screw-threaded member 171 are formed as a one-piece unitary member, as shown in FIG. 6.

Third Embodiment

Figure 7:
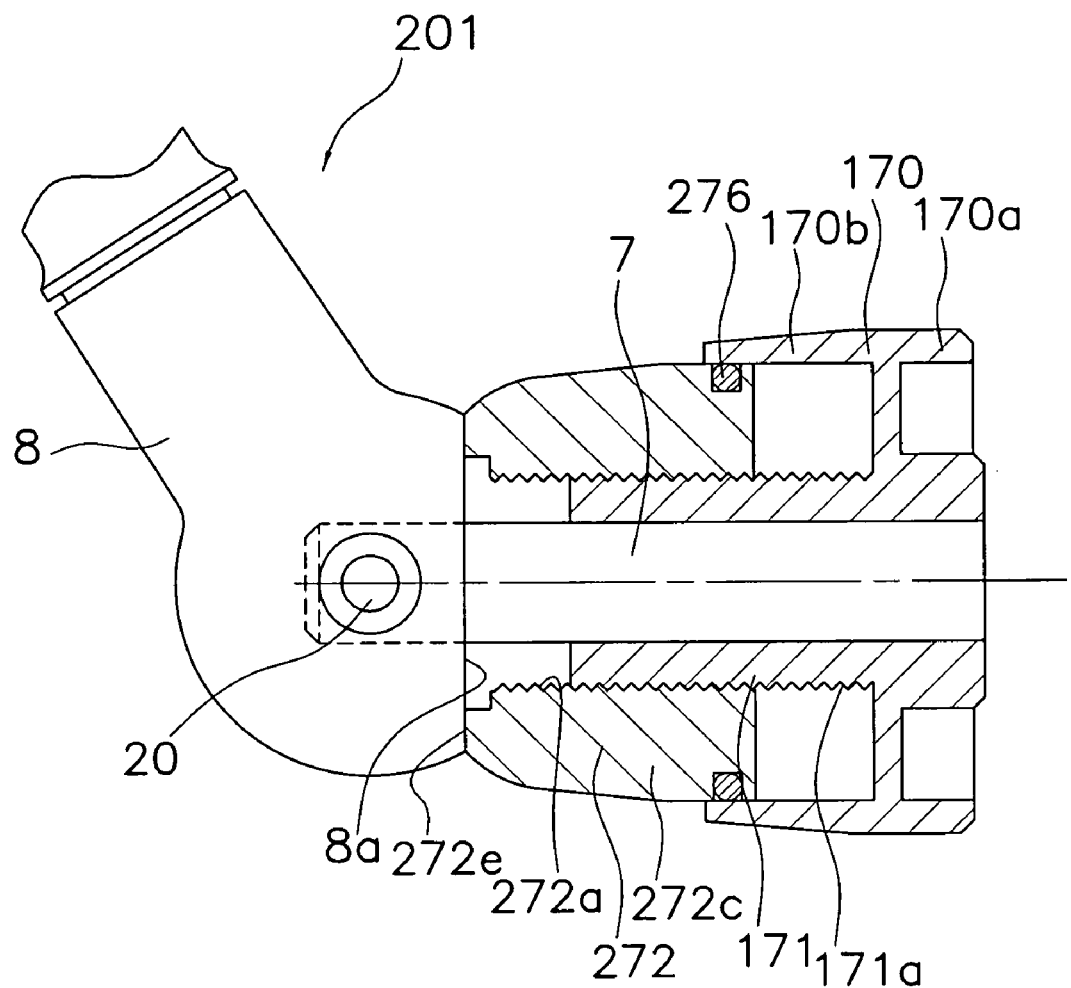
FIG. 7 is a partial cross-sectional view of a handle assembly for the spinning reel illustrated in FIGS. 1 and 2 in accordance with a third embodiment of the present invention.

Referring now to FIG. 7, a handle assembly 201 in accordance with a third embodiment will now be explained. In view of the similarity between the second and third embodiments, the parts of the third embodiment that are identical to the parts of the second embodiment will be given the same reference numerals as the parts of the second embodiment. Moreover, the descriptions of the parts of the third embodiment that are identical to the parts of the second embodiment may be omitted for the sake of brevity.

In the third embodiment, a moveable member 272 has a groove for an elastic member 276, e.g., an O-ring. The elastic member 276 is disposed in the groove between an internal circumference of the cover member 170 and an external circumference of the movable member 272, as shown in FIG. 7. By providing the elastic member 276, seawater, mud and other contaminants are prevented from entering an inside of the reel via a gap between the cover member 170 and the movable member 272.

Fourth Embodiment

Figure 8:
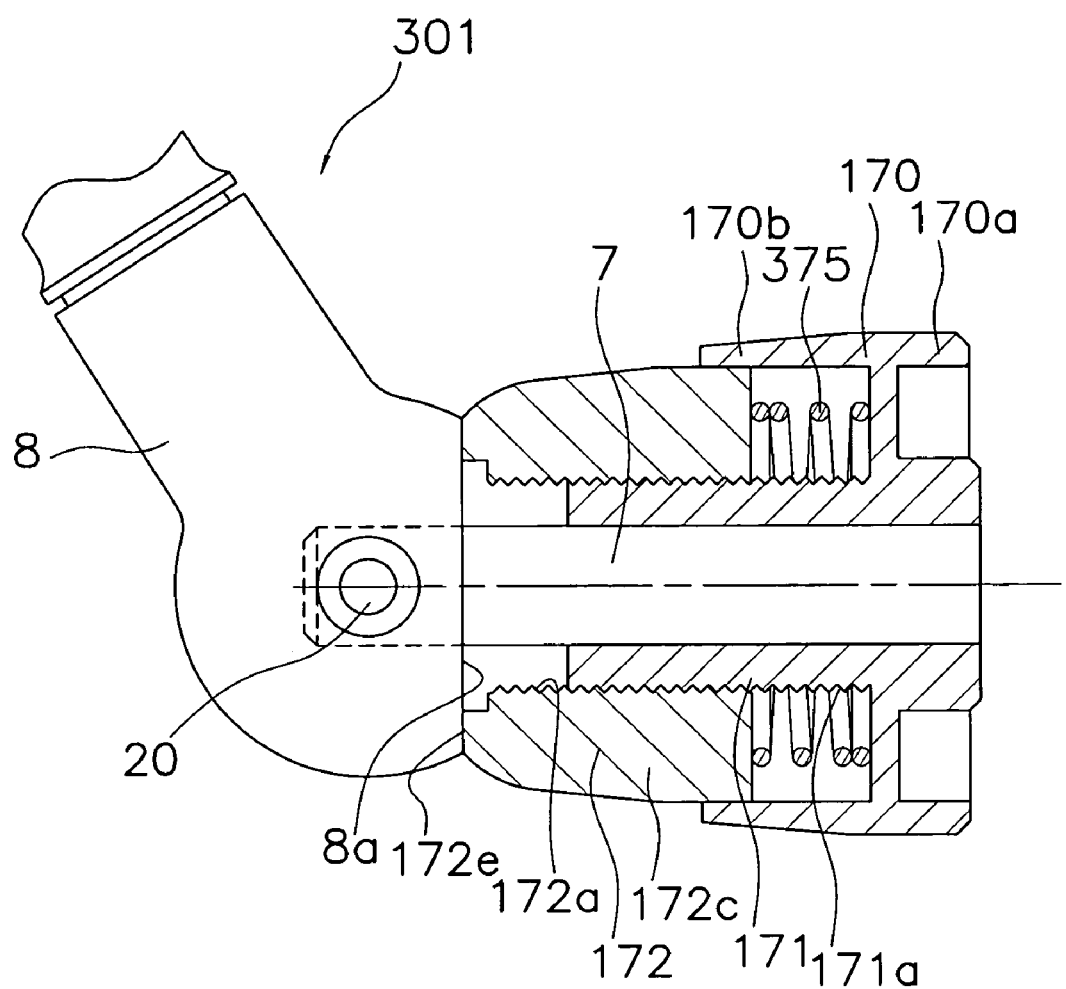
FIG. 8 is a partial cross-sectional view of a handle assembly for the spinning reel illustrated in FIGS. 1 and 2 in accordance with a fourth embodiment of the present invention.

Referring now to FIG. 8, a handle assembly 301 in accordance with a fourth embodiment will now be explained. In view of the similarity between the second and fourth embodiments, the parts of the fourth embodiment that are identical to the parts of the second embodiment will be given the same reference numerals as the parts of the second embodiment. Moreover, the descriptions of the parts of the fourth embodiment that are identical to the parts of the second embodiment may be omitted for the sake of brevity.

In the fourth embodiment, a second force applying member 375, e.g., a coil spring, is provided between the cover member 170 and the movable member 172, as shown in FIG. 8. By providing the second force applying member 375, the movable member 172 is loaded toward the handle arm 8 and undesirable looseness of the movable member 172 is suppressed.

Fifth Embodiment

Figure 9:
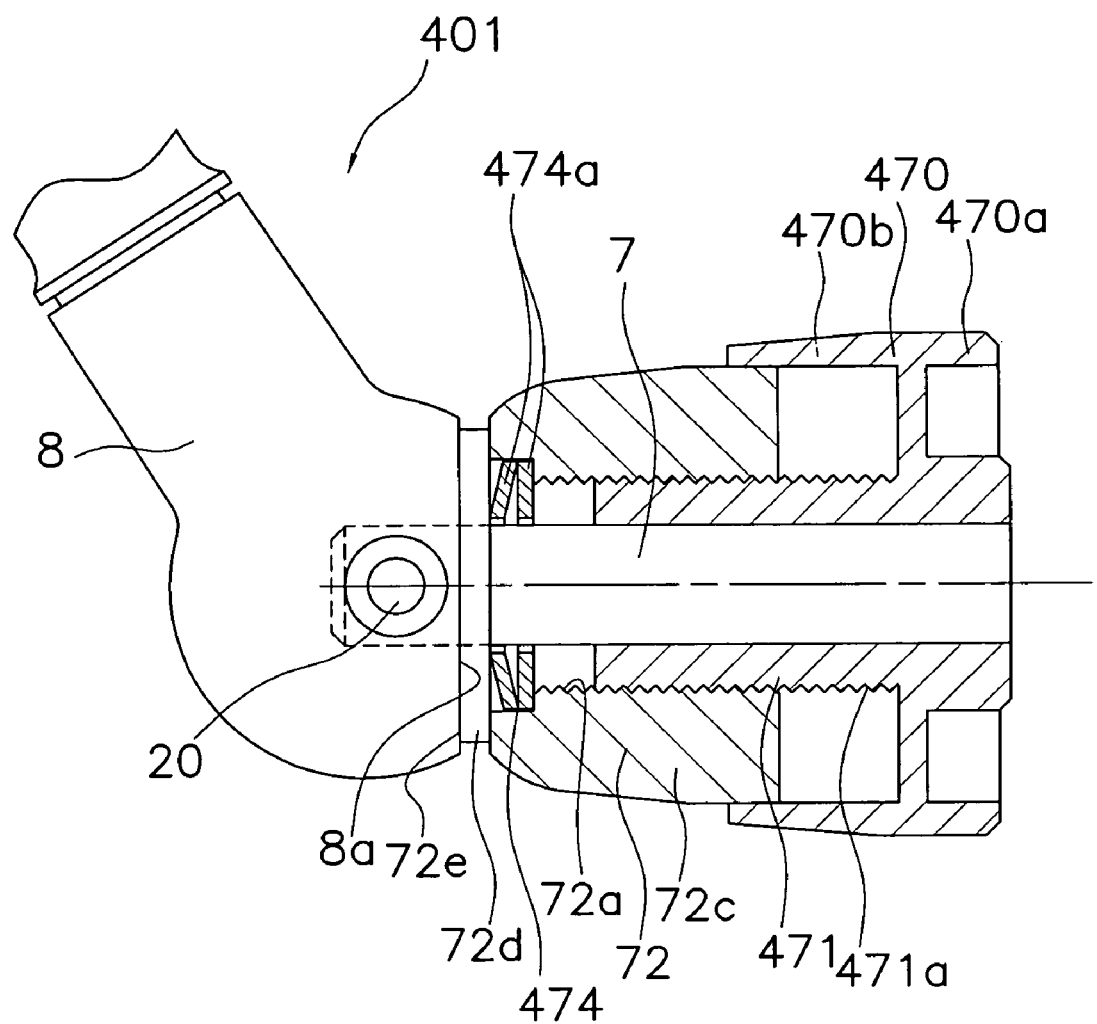
FIG. 9 is a partial cross-sectional view of a handle assembly for the spinning reel illustrated in FIGS. 1 and 2 in accordance with a fifth embodiment of the present invention.

Referring now to FIG. 9, a handle assembly 401 in accordance with a fifth embodiment will now be explained. In view of the similarity between the first and fifth embodiments, the parts of the fifth embodiment that are identical to the parts of the first embodiment will be given the same reference numerals as the parts of the first embodiment. Moreover, the descriptions of the parts of the fifth embodiment that are identical to the parts of the first embodiment may be omitted for the sake of brevity.

In the first embodiment the first force applying member 74 included a belleville spring provided between the movable member 72 and the handle arm 8. In the fifth embodiment two belleville springs 474a are used as a first force applying member 474, as shown in FIG. 9.

In the first embodiment, the cover member 70 and the screw-threaded member 71 are separate members. In the fifth embodiment, a cover member 470 and a screw-threaded member 471 are formed as a one-piece unitary member, as shown in FIG. 9.

Sixth Embodiment

Figure 10:
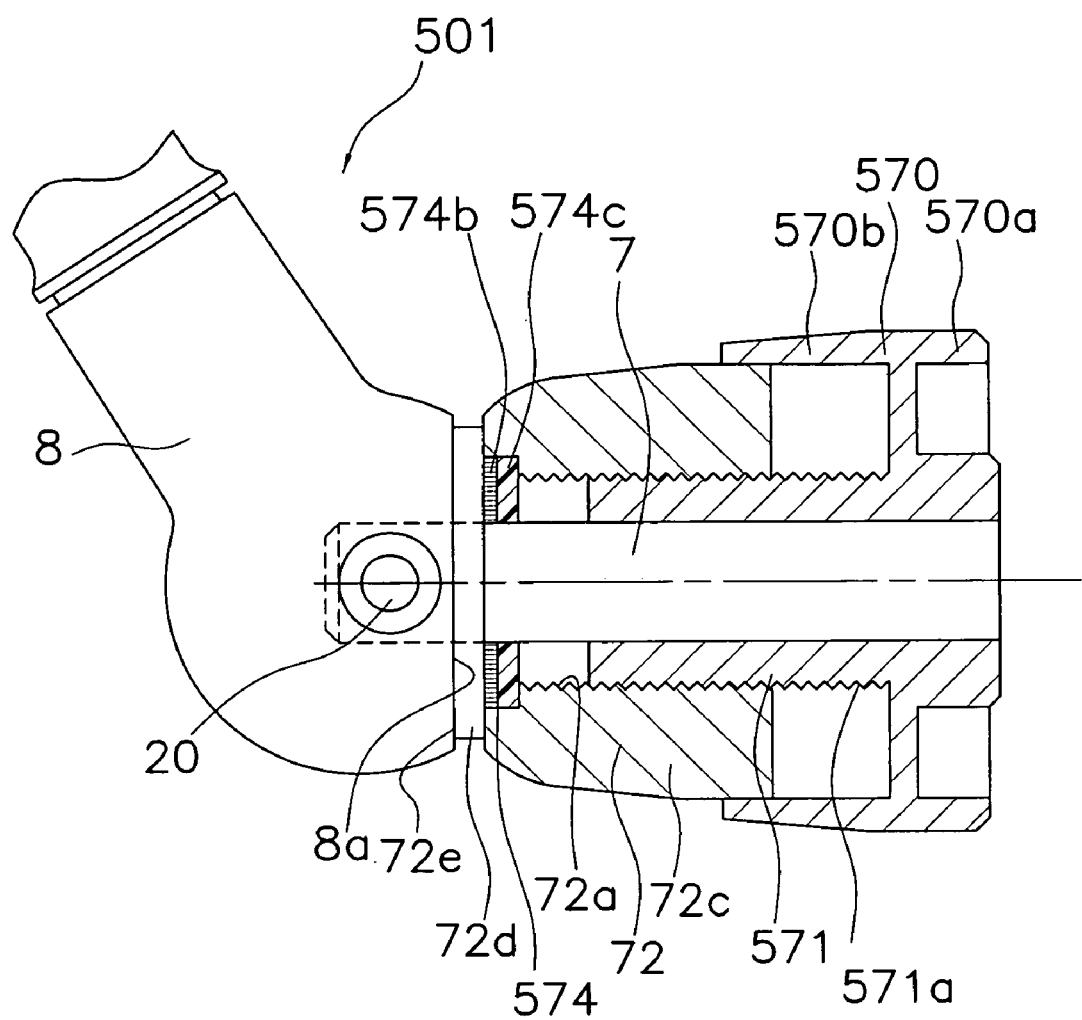
FIG. 10 is a partial cross-sectional view of a handle assembly for the spinning reel illustrated in FIGS. 1 and 2 in accordance with a sixth embodiment of the present invention.

Referring now to FIG. 10, a handle assembly 501 in accordance with a sixth embodiment will now be explained. In view of the similarity between the first and sixth embodiments, the parts of the sixth embodiment that are identical to the parts of the first embodiment will be given the same reference numerals as the parts of the first embodiment. Moreover, the descriptions of the parts of the sixth embodiment that are identical to the parts of the first embodiment may be omitted for the sake of brevity.

In the first embodiment the first force applying member 74 included a belleville spring provided between the movable member 72 and the handle arm 8. In the sixth embodiment, a toothed washer 574b and a third ring-shaped member 574c made of a synthetic resin material are provided as a first force applying member 574, as shown in FIG. 10.

In the first embodiment, the cover member 70 and the screw-threaded member 71 are separate members. In the sixth embodiment, a cover member 570 and a screw-threaded member 571 are formed as a one-piece unitary member, as shown in FIG. 10.

Seventh Embodiment

Figure 11:
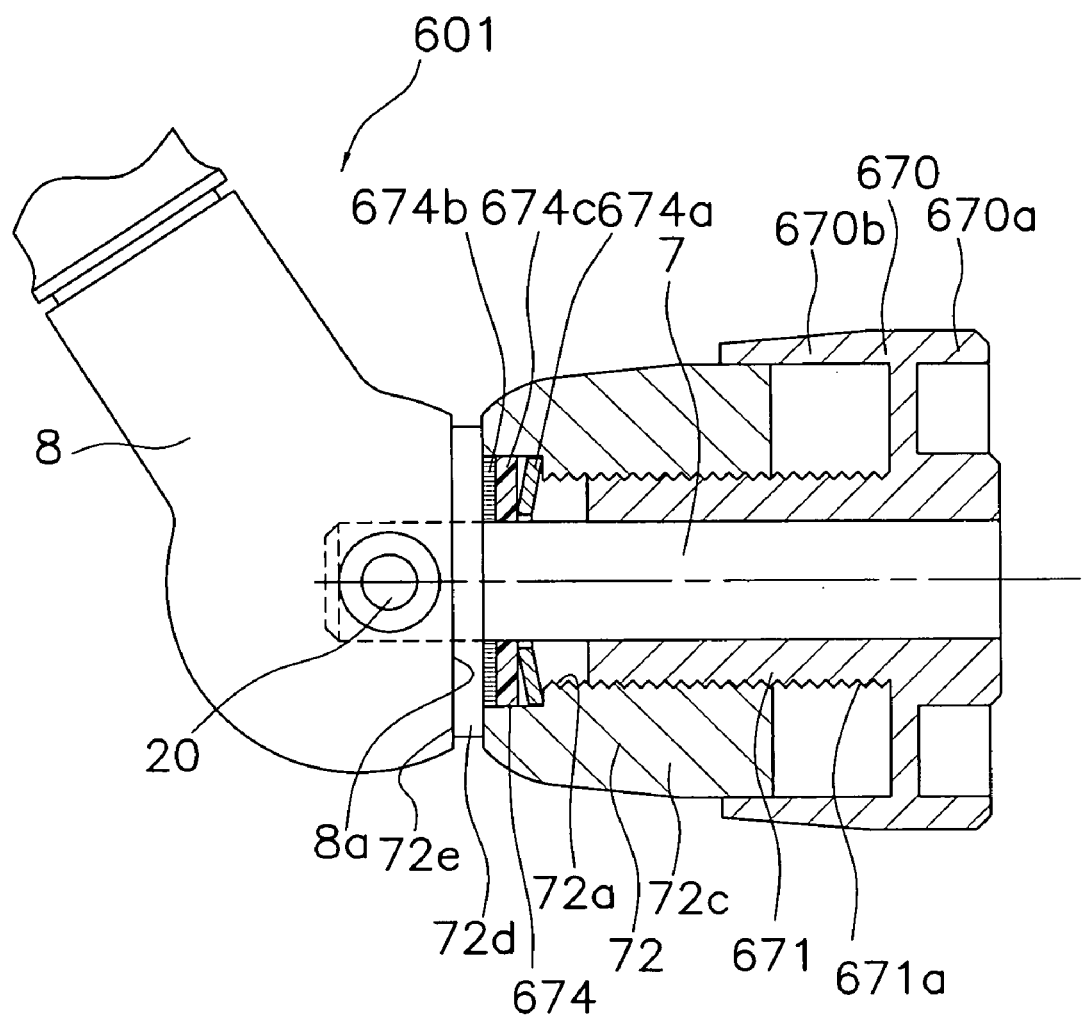
FIG. 11 is a partial cross-sectional view of a handle assembly for the spinning reel illustrated in FIGS. 1 and 2 in accordance with a seventh embodiment of the present invention.

Referring now to FIG. 11, a handle assembly 601 in accordance with a seventh embodiment will now be explained. In view of the similarity between the first and seventh embodiments, the parts of the seventh embodiment that are identical to the parts of the first embodiment will be given the same reference numerals as the parts of the first embodiment. Moreover, the descriptions of the parts of the seventh embodiment that are identical to the parts of the first embodiment may be omitted for the sake of brevity.

In the first embodiment, the first force applying member 74 included a belleville spring provided between the movable member 72 and the handle arm 8. In the seventh embodiment, a toothed washer 674b, a third ring-shaped member 674c made of a synthetic resin material, and one belleville spring 674a are provided as a force applying member 674, as shown in FIG. 11. Since the force applying member 674 loads the movable member 72 toward the handle arm 8, undesirable looseness of the movable member 72 is suppressed.

In the first embodiment, the cover member 70 and the screw-threaded member 71 are separate members. In the seventh embodiment, a cover member 670 and a screw-threaded member 671 are formed as a one-piece unitary member, as shown in FIG. 11.

Eighth Embodiment

Figure 12:
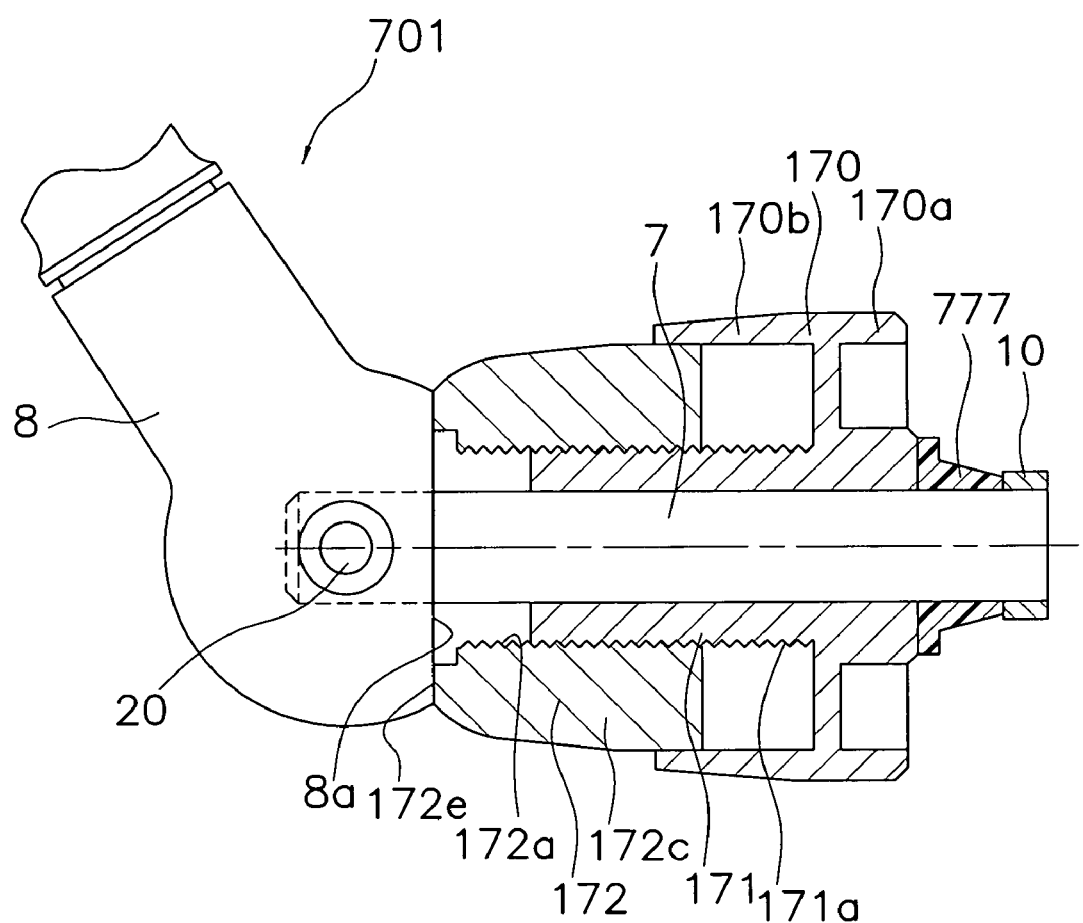
FIG. 12 is a partial cross-sectional view of a handle assembly for the spinning reel illustrated in FIGS. 1 and 2 in accordance with an eighth embodiment of the present invention.

Referring now to FIG. 12, a handle assembly 701 in accordance with an eighth embodiment will now be explained. In view of the similarity between the second and eighth embodiments, the parts of the eighth embodiment that are identical to the parts of the second embodiment will be given the same reference numerals as the parts of the second embodiment. Moreover, the descriptions of the parts of the eighth embodiment that are identical to the parts of the second embodiment may be omitted for the sake of brevity.

In the eighth embodiment, a bushing member 777 is arranged between the cover member 170 and the master gear shaft 10. The bushing member 777 is configured such that an external circumference of the bushing member 777 tapers from the cover member 170 toward the master gear shaft 10. By providing such a bushing member 777, undesirable looseness between the cover member 170 and the master gear shaft 10 is suppressed.

The terms of degree such as "substantially", "about" and "approximately" as used herein mean a reasonable amount of deviation of the modified term such that the end result is not significantly changed. For example, these terms can be construed as including a deviation of at least ±5% of the modified term if this deviation would not negate the meaning of the word it modifies.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents. Thus, the scope of the invention is not limited to the disclosed embodiments.

What is claimed is:

1. A spinning reel handle assembly comprising:
a handle shaft portion configured to be non-rotatably mounted to an internal section of a master gear shaft, the handle shaft portion having a tip end section that protrudes from an end part of the master gear shaft;
a cylindrical cover member mounted on an external circumference of the tip end section of the handle shaft portion and configured to cover an outer periphery of the tip end section of the handle shaft portion;
a cylindrical screw-threaded member non-rotatably disposed on the external circumference of the tip end section of the handle shaft portion, the screw-threaded member having a male threaded section on an external circumference of the screw-threaded member;
a cylindrical movable member configured to be inside an internal circumference of the cover member, the movable member having an internal circumference with a female threaded section configured to be threaded onto the male threaded section;
a handle arm having a base end that is pivotally mounted to the tip end section of the handle shaft portion and a contact part configured to restrict pivoting when the contact part contacts an end face of the movable member and to allow pivoting when the contact part is separated from the end face of the movable member, the handle arm extending in a direction that intersects with a center axis of the handle shaft portion; and
a handle grip mounted at a tip end of the handle arm to rotate freely about an axis that is substantially parallel to the center axis of the handle shaft portion,
the cover member being configured to cover at least a portion of an external circumference of the movable member and an entire portion of the male threaded section on which the movable member is not mounted.

2. The spinning reel handle assembly as recited in claim 1, wherein
the cover member includes a first cylindrical section configured to cover an outer periphery of a portion of a reel body that supports an end part of the master gear shaft and a second cylindrical section configured to protrude in an opposite direction as the first cylindrical section and cover a portion of the male threaded section.

3. The spinning reel handle assembly as recited in claim 1, wherein the cover member and the handle shaft portion are formed as a one-piece unitary member.

4. The spinning reel handle assembly as recited in claim 1, wherein
the cover member and the handle shaft portion are formed as separate members.

5. The spinning reel handle assembly as recited in claim 1, wherein
the screw-threaded member and the cover member are formed as a one-piece unitary member.

6. The spinning reel handle assembly as recited in claim 1, wherein
the screw-threaded member and the cover member are formed as separate members.

7. The spinning reel handle assembly as recited in claim 1, further comprising
an elastic member provided between a portion of the internal circumference of the cover member and a portion of the external circumference of the movable member.

8. The spinning reel handle assembly as recited in claim 1, further comprising
a first force applying member arranged between the movable member and the handle arm and configured to apply a force against the movable member to the contact part of the handle arm.

9. The spinning reel handle assembly as recited in claim 1, further comprising
a second force applying member arranged between the cover member and the movable member and configured to apply a force against the movable member toward the handle arm.

10. The spinning reel handle assembly as recited in claim 1, further comprising
a bushing member arranged between the cover member and the master gear shaft and having an external circumference that tapers from the cover member toward the master gear shaft.

11. The spinning reel handle assembly as recited in claim 1, wherein
the movable member is furnished with a main body member having the female threaded section and a ring-shaped member provided as a separate entity from the main body member, and the ring-shaped member has an end face that selectively contacts the contact part of the handle arm.

12. A spinning reel comprising:
a reel unit;
a rotor rotatively supported on a front of the reel unit;
a spool disposed at a front of the rotor; and
a handle assembly rotatively supported by the reel unit, the handle assembly including
a handle shaft portion configured to be non-rotatably mounted to an internal section of a master gear shaft relative to the master gear shaft, the handle shaft portion having a tip end section that protrudes from an end part of the master gear shaft,
a cylindrical cover member mounted on an external circumference of the tip end section of the handle shaft portion and configured to cover an outer periphery of the tip end section of the handle shaft portion,
a cylindrical screw-threaded member non-rotatably disposed relative to the handle shaft portion on the external circumference of the tip end section of the handle shaft portion, the screw-threaded member having a male threaded section on an external circumference of the screw-threaded member,
a cylindrical movable member configured to be inside an internal circumference of the cover member, the movable member having an internal circumference with a female threaded section configured to be threaded onto the male threaded section,
a handle arm having a base end that is pivotally mounted to the tip end section of the handle shaft portion and a contact part configured to restrict pivoting when the contact part contacts an end face of the movable member and to allow pivoting when the contact part is separated from the end face of the movable member, the handle arm extending in a direction that intersects with a center axis of the handle shaft portion, and
a handle grip mounted at a tip end of the handle arm to rotate freely about an axis that is substantially parallel to the center axis of the handle shaft portion,
the cover member being configured to cover at least a portion of an external circumference of the movable member and an entire portion of the male threaded section on which the movable member is not mounted.

* * * * *